(12) United States Patent
Campau

(10) Patent No.: US 8,679,663 B2
(45) Date of Patent: Mar. 25, 2014

(54) PUSH-IN TURN-OUT VENT CAP FOR LEAD-ACID BATTERY

(75) Inventor: Daniel N. Campau, Ada, MI (US)

(73) Assignee: Flow-Rite Controls, Ltd., Byron Center, MI (US)

( * ) Notice: Subject to any disclaimer, the term of this patent is extended or adjusted under 35 U.S.C. 154(b) by 1225 days.

(21) Appl. No.: 12/486,373

(22) Filed: Jun. 17, 2009

(65) Prior Publication Data

US 2010/0323229 A1 Dec. 23, 2010

(51) Int. Cl.
*H01M 2/12* (2006.01)

(52) U.S. Cl.
USPC .................................. 429/89; 429/82; 429/53

(58) Field of Classification Search
USPC .................................. 429/89, 82, 53
See application file for complete search history.

(56) References Cited

U.S. PATENT DOCUMENTS

| 5,832,946 | A | 11/1998 | Campau |
| 6,644,338 | B1 | 11/2003 | Campau |
| 6,782,913 | B2 | 8/2004 | Campus |
| 7,029,786 | B2 | 4/2006 | Campau |
| 2010/0167109 | A1 * | 7/2010 | Campau et al. ................. 429/82 |

* cited by examiner

*Primary Examiner* — Jane Rhee
(74) *Attorney, Agent, or Firm* — Warner Norcross & Judd LLP

(57) ABSTRACT

A battery vent cap capable of push-in installation and turn-out removal. The cap includes bayonet tabs. The tabs in turn each include a ramp portion to facilitate movement of the cap bayonet tabs past bayonet tabs in a battery vent port as the vent cap is inserted into the port axially without substantial rotation. The interfitting bayonet tabs retain the vent cap within the vent port and also permit the vent cap to be unscrewed and removed from the vent port. In a preferred embodiment, the vent cap includes a swivel connector to which a watering hose may be connected. The swivel enables the vent cap to be unscrewed from the vent portion without having to remove the watering hose from the swivel connector.

11 Claims, 5 Drawing Sheets

PUSH-IN TURN-OUT VENT CAP FOR LEAD-ACID BATTERY

BACKGROUND OF THE INVENTION

The present invention relates to vent caps for lead-acid batteries, and more particularly to bayonet-style vent caps.

Many devices use a quarter-turn or bayonet-style attachment in applications where quick installation and removal are desired. For example, lead-acid batteries use this method of attachment for securing the vent caps within the vent ports. The same attachment method is often used in the manufacture of battery watering systems to mount the watering valves to the vent ports.

A typical prior art battery vent cap 10 and vent port are illustrated in FIG. 1. The vent cap 10 includes bayonet tabs 12, and the vent port includes bayonet tabs 24. The tabs 12 and 24 have substantially similar lead angles. The vent cap is tightened within the vent port as the cap is rotated 90° clockwise. This tightening secures the vent cap 10 and provides a seal between the cap flange 14 and the vent port rim 22. The seal prevents the migration of battery acid out of the cell. The vent cap 10 can be easily rotated 90° counterclockwise to remove the cap from the vent port 20 for routine battery maintenance and inspections. The described bayonet attachment system has been used for decades and is still the most common system of attachment for battery vent caps and watering systems on deep-cycle batteries in North America.

Recently, some manufacturers of caps, particularly caps which are part of battery watering systems, have adopted a push-in style of vent cap. An example of this style of vent cap 30 is illustrated in FIG. 3. The cap 30 includes a resiliently flexible circumferential rib 32 which is slightly larger in diameter than the inside diameter of the bayonet tabs 24. This construction enables the cap 30 to be pushed into place with the rib 32 providing a snug fit behind the bayonet tabs 24. This installation method is very fast compared to the normal quarter-turn method. The push-in caps are being used on the assembly line by battery manufacturers and manufacturers of battery-powered equipment, such as golf cart manufacturers. The caps also enable faster installation of battery watering systems in the field. After the caps 30 are pressed into place, the caps can rotate 360° within the vent port, which is helpful in aligning connection ports on the caps with watering system tubing.

The push-in vent caps are not without problems. For example, because (a) the retaining surfaces of the bayonet tabs 24 in the vent port 20 have a lead angle as shown in FIG. 2 and (b) the retaining rib 32 on the cap 30 does not, the retention of the cap is provided by contact in only two diametrically opposite points on the bayonet tabs 24. This two-point contact does not provide a tight seal between the cap 30 and the vent port 20. In fact, the two points of contact form an axis of rotation that enables the cap to rock or tilt, which further reduces the quality of the seal. To combat the tilting effect, the manufacturers of the push-in style caps make the push-in fit very snug and strong to improve the seal and to prevent the cap from popping out of the vent port as the cover flexes during use. The strong fit also assists in maintaining an appropriate seal over a wide range of temperatures and vibrations experienced by the battery. Unfortunately, in order to remove these push-in caps for routine battery maintenance, field personnel use screwdrivers or channel-lock wrenches to pry out or pull out the caps. This methodology has great potential to damage the battery cover and/or cap. It also can be hazardous because it involves the use of a metal tool on the battery top, which can cause dangerous sparks that can trigger explosions. The benefit of rapid installation provided by these push-in caps is therefore offset by the difficult, potentially damaging, and hazardous job of removing the caps for routine battery maintenance.

SUMMARY OF THE INVENTION

The aforementioned problems are overcome in the present invention providing a battery cap that may be pushed into a vent port and subsequently unscrewed or otherwise rotated for removal.

In a first embodiment, the vent port includes bayonet tabs having ramps along their lower surfaces. The ramps facilitate installation of the vent caps into the battery port; and specifically, the ramps enable the bayonet tabs to move past the corresponding bayonet tabs in the vent port. Once installed, the interfitting bayonet tabs retain the cap in the vent port. The vent caps can be rotated to release the bayonet retention structure so that the cap may be removed from the vent port for maintenance or service. When the cap is to be reinstalled, it may be either pushed into the vent port (as during initial installation) or screwed into the vent port using the conventional bayonet structure.

In a second embodiment, the cap is adapted for use in a battery watering system and includes a swivel connector on its top. Tubing can be connected to the swivel connector in conjunction with a battery watering system. The swivel connector can remain in a fixed angular orientation as the cap is rotated for removal and reinstallation.

The battery caps provides the speed of installation needed for the assembly line, while maintaining the ease provided by quarter-turn caps for removal for safe, convenient, routine battery maintenance.

In either embodiment, the cap includes alignment tabs that enable the cap to drop into the vent port in an orientation ready for push-in attachment. The alignment tabs enable installers to quickly orient the cap and then push it in for snap-fit retention.

These and other advantages and features of the invention will be more fully understood and appreciated by reference to the description of the current embodiments and the drawings.

DESCRIPTION OF THE CURRENT EMBODIMENTS

I. First Current Embodiment

Figure 1:
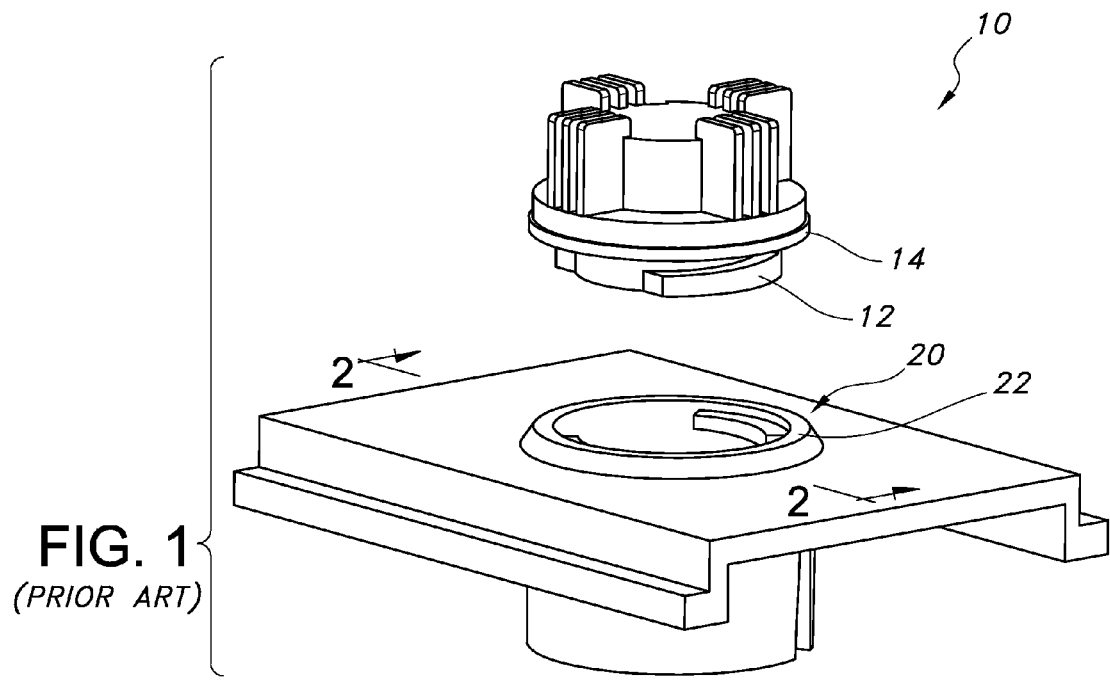
FIG. 1 is a perspective view of a prior art quarter-turn vent cap and battery cover.
Figure 2:
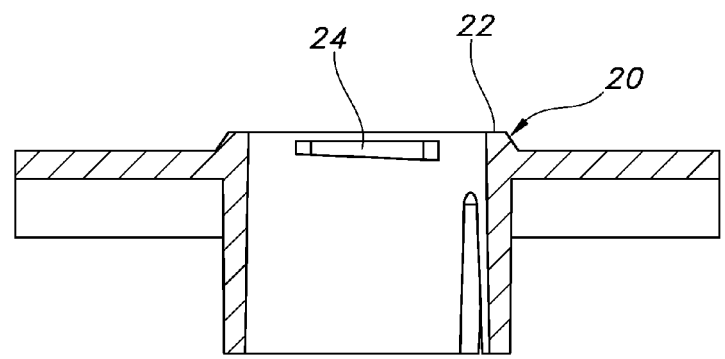
FIG. 2 is a sectional view taken along line 2-2 in FIG. 1.
Figure 3:
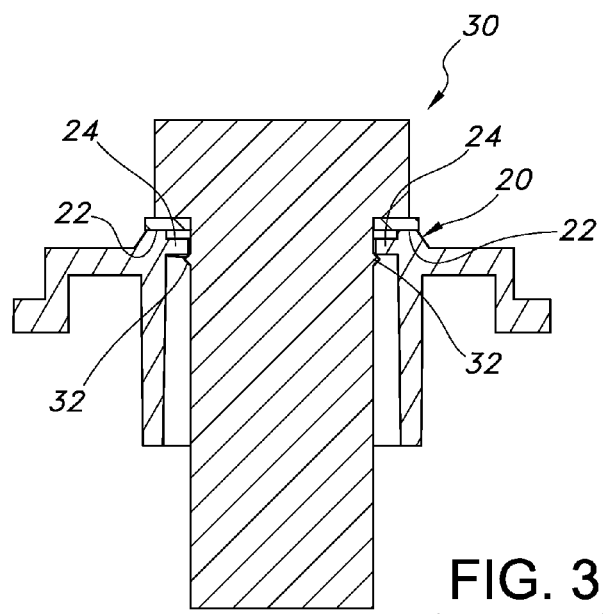
FIG. 3 is a sectional view of a prior art push-in vent cap in a battery cover.
Figure 4:
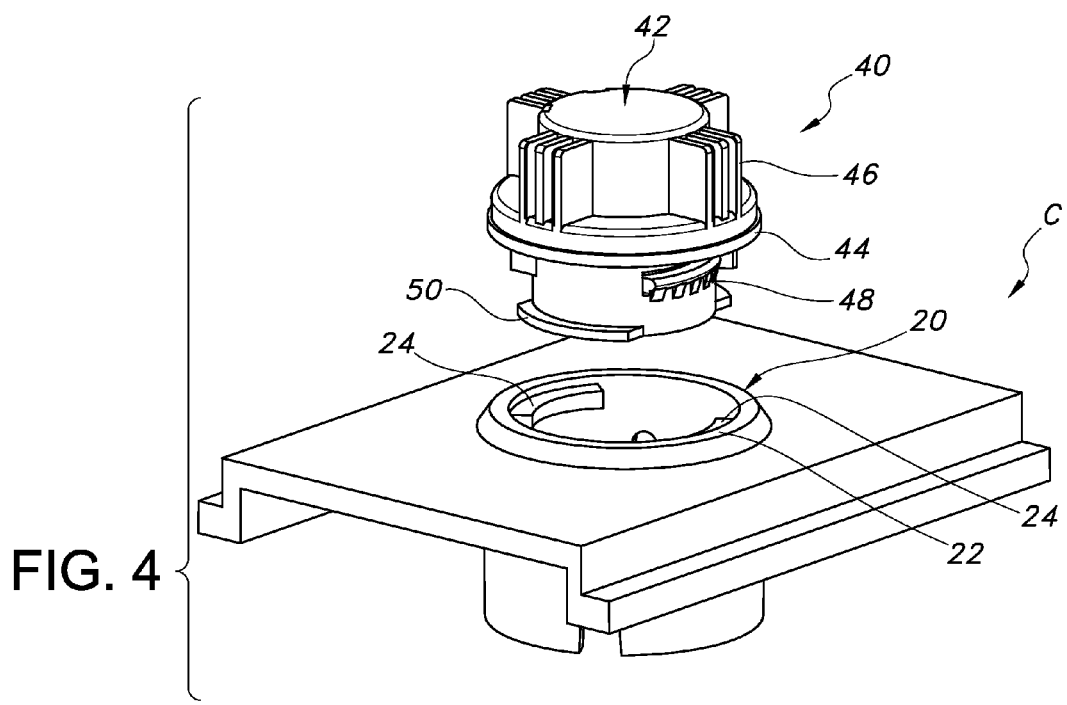
FIG. 4 is a perspective view showing the vent cap of the present invention and a conventional battery cover.
Figure 5:
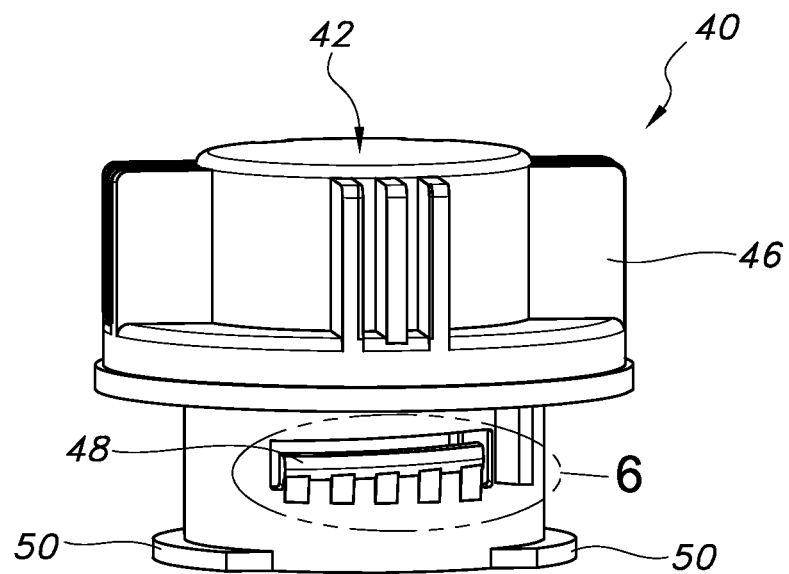
FIG. 5 is a side elevational view of the vent cap.
Figure 6:
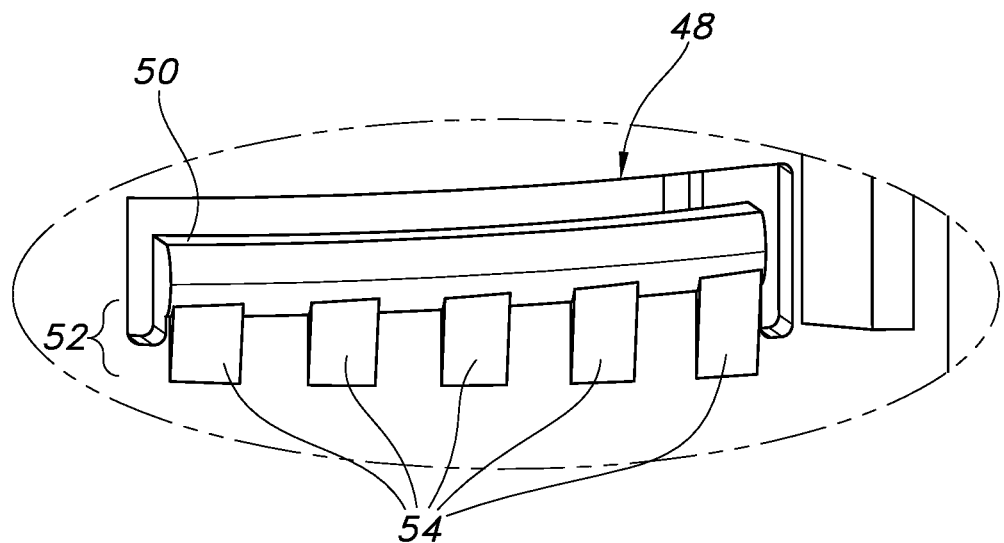
FIG. 6 is an enlarged view of the area within line 6 in FIG. 2.

A battery vent cap constructed in accordance with a first current embodiment of the invention is illustrated in FIGS. 4-6 and generally designated 40. The vent cap includes a body 42 and a sealing ring 44.

The vent cap body 42 includes a gripping portion 46, a pair of bayonet tabs 48, and a pair of alignment tabs 50. In the preferred embodiment, the vent cap body 42 is fabricated of plastic, but the body can be made of any suitable material known to those skilled in the art.

The gripping portion 46 is of conventional design and provides a gripping means for rotating the cap. The grip portion 46 can be in the form of tabs, knurls, spanner recesses, or any other appropriate design. Because the attachment of the cap 40 does not require excessive clamp force, a plastic spanner tool can be used to remove the cap, or even finger pressure alone may be adequate.

The bayonet tabs 48 are of a unique construction as perhaps best illustrated in FIGS. 5-6. As disclosed, the cap 40 includes two diametrically opposed tabs 48. However, any number of tabs and any angular orientation may be used, for example depending on the configuration of the vent ports 20. Each bayonet tab 48 includes a lead angle substantially similar to the lead angle of the bayonet tab 24 within the vent port 20. The bayonet tab 48 includes an upper portion 50 and a lower portion 52. The upper portion 50 is of conventional design to cooperate with the vent port bayonet tabs 24 after the vent cap 40 has been installed in the battery cover 20. The lower portion 52 includes a plurality of ramps or ramp surfaces 54 which extend from the cap body 42 and are oriented generally perpendicularly to the bayonet tab 48, which is generally longitudinally with respect to the vent cap body 42. The ramps 54 engage the vent port bayonet tabs 24 as the vent cap 40 is inserted into the battery cover as described below. Preferably, the vent cap bayonet tabs 48 are resiliently flexible, which facilitates their movement past the vent port tabs 24.

As disclosed, the cap 40 includes two diametrically opposed alignment tabs 50 oriented approximately 90 degrees offset from the bayonet tabs 48. As with the bayonet tabs 48, any number of alignment tabs 50 and any angular offset of the alignment tabs with respect to the bayonet tabs may be used, for example depending on the configuration of the vent ports 20. The alignment tabs 50 pass between the bayonet tabs 24 in the vent port 20 as the vent cap 40 is inserted into the battery cover. The alignment tabs 50 ensure that the vent cap bayonet tabs 48 are longitudinally aligned with the vent port bayonet tabs 24 during installation.

The sealing ring 44 is of conventional design and material.

The battery cover C is of conventional design and corresponds to the battery cover illustrated in conjunction with the prior art embodiments. The battery cover C includes one or more vent ports 20 each including a pair of diametrically opposed bayonet tabs 24. The tabs provide threaded portions within the vent port 20.

Installation of the vent cap 40 within the vent port 20 is accomplished easily through axial movement of the cap without substantial rotational movement of the cap. Specifically, the alignment tabs 50 are longitudinally aligned with the spaces between the vent port bayonet tabs 24. The vent cap 40 is then dropped into the vent port so that the alignment tabs 50 pass between the vent port bayonet tabs 24. In this orientation, the vent cap bayonet tabs 48 are longitudinally aligned with the vent port bayonet tabs 24. As the vent cap 40 continues its travel into the vent port 20, the ramp surfaces 54 engage the vent port tabs 24. The ramping function provided by the ramps 54 enable the vent cap tabs 48 to pass beyond the vent port bayonet tabs 24. The resilient flexibility of the bayonet tabs 48 facilitates their passage beyond the vent port bayonet tabs 24. Ultimately, the vent cap bayonet tabs 48 lock behind the vent port bayonet tabs 24 to secure the cap in position. When fully installed, the sealing ring 44 seats against the rim 22 of the vent port 20.

When the battery is to be maintained or serviced, the vent caps 40 may be easily removed. Specifically, the vent cap 40 is rotated counterclockwise 90° to release the vent cap bayonet tabs 48 from the vent port bayonet tabs 24. At this point, the alignment tabs 50 will be located under the vent port tabs 24. Therefore, the vent cap 40 is rotated an additional 90° (in either direction) so that the alignment tabs 50 maybe withdrawn between the vent port tabs 24.

After the battery has been maintained or serviced, the vent cap can be reinstalled in either of two ways. First, it may be pushed longitudinally into the vent port 20 as described above. Alternatively, the cap may be reinstalled using the bayonet mount construction by first moving the alignment tabs 50 below the vent port tabs 24, rotating the cap 90° (in either direction), lowering the cap until the bayonet tabs 48 and 24 are rotationally aligned with one another and finally turning the vent cap 40 90° clockwise to engage the bayonet structure.

II. Second Current Embodiment

Because the first current embodiment does not enable the cap to rotate 360 degrees within the vent port, the vent cap cannot be used as a watering caps. Specifically, the watering tube connection to the watering cap would prohibit or at least interfere with the rotational movement required to remove the cap from the vent port.

Figure 7:
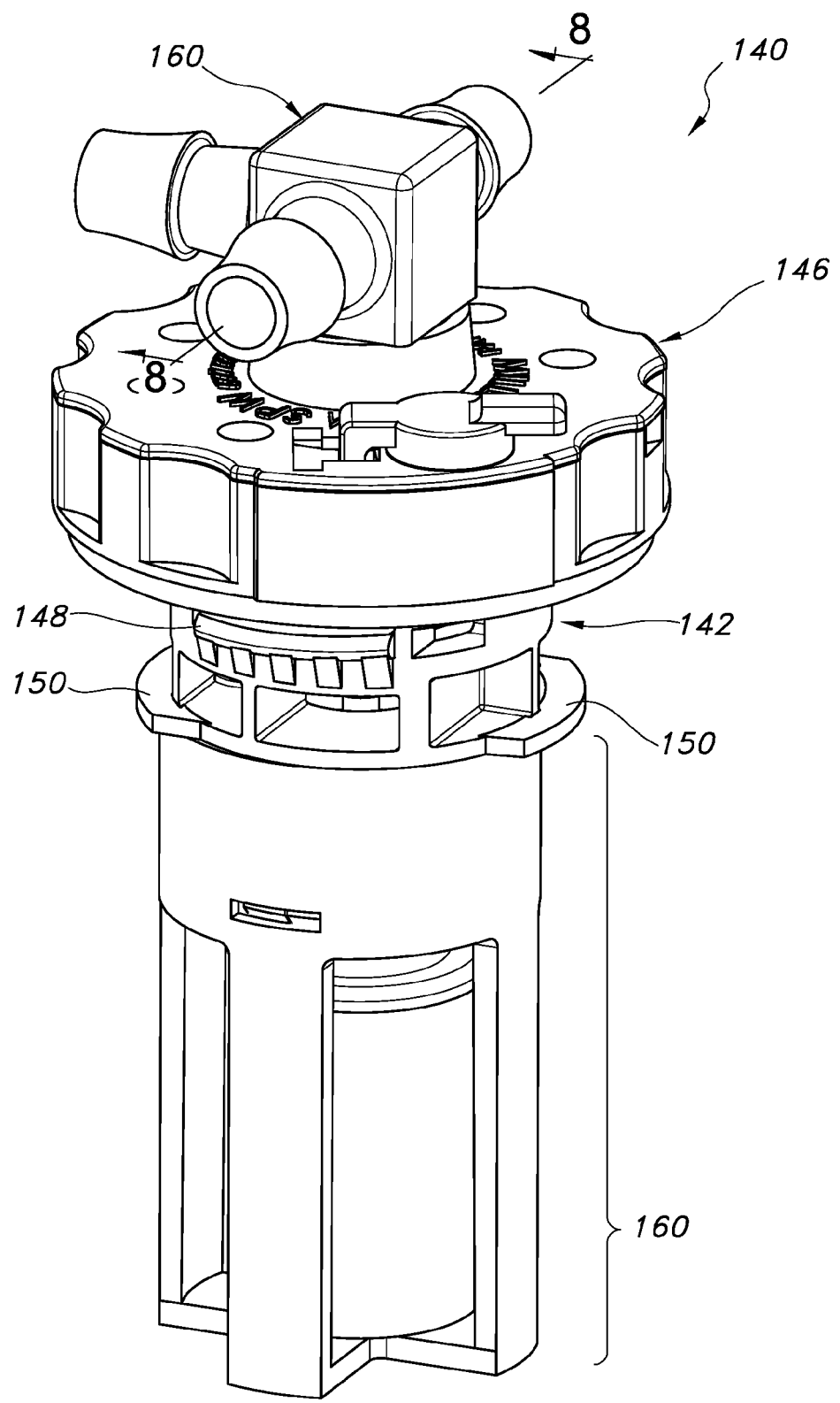
FIG. 7 is a perspective view of an alternative embodiment of the vent cap including a swivel connector and a water valve assembly.
Figure 8:
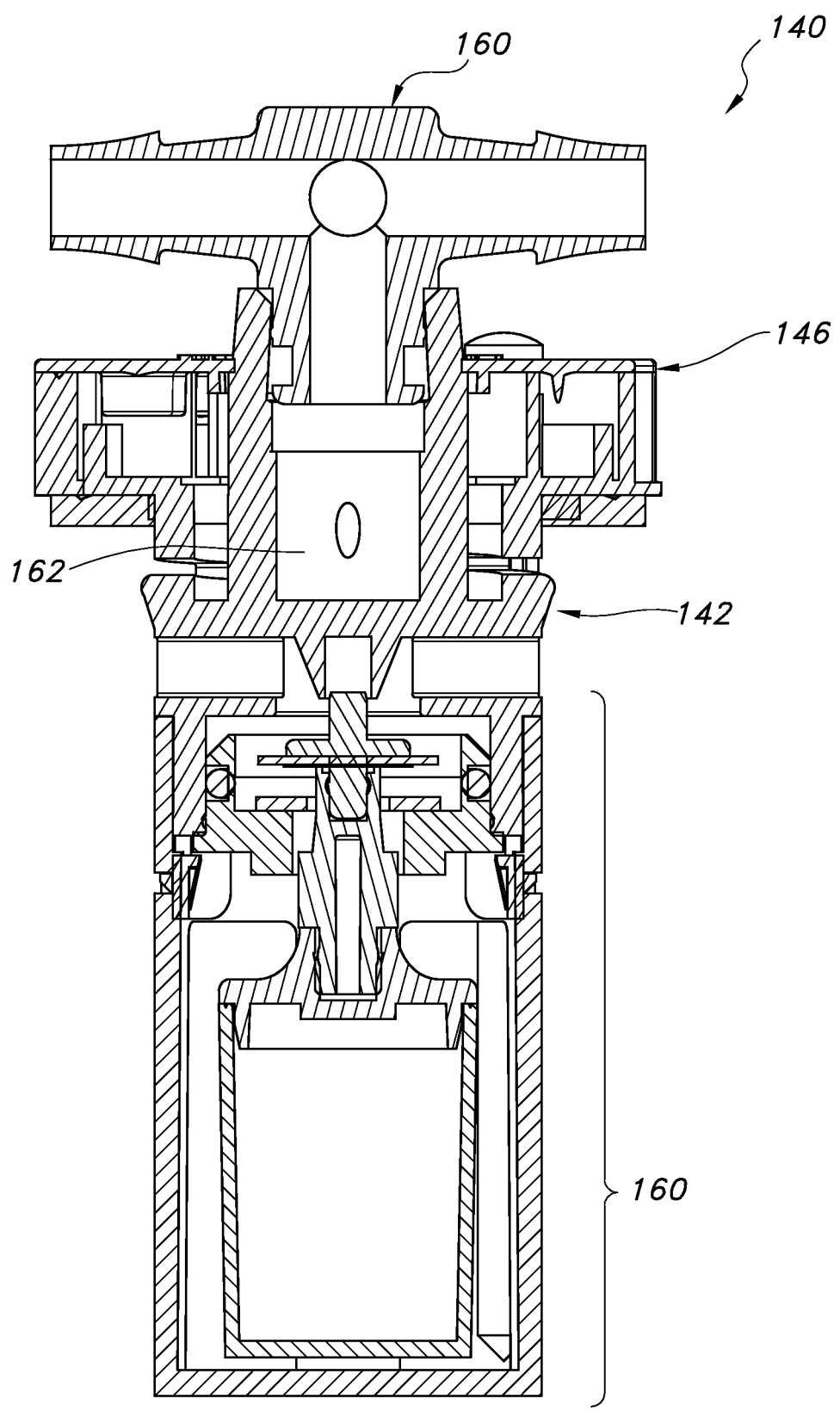
FIG. 8 is a sectional view taken along line 8-8 in FIG. 7.

A second current embodiment of the battery cap is illustrated in FIGS. 7 and 8 and generally designated 140. The cap 130 includes a swivel connector 160 on its top. Preferably, the swivel cap is mounted on the central axis of the cap. The swivel connector 160 is capable of rotating relative to the cap to enable convenient connection of the water feed tubing. The swivel connector 160 also makes installation of the water system tubing faster because the swivel connectors self-align as the tubing is connected between valves. This is in marked contrast to the prior art caps having a very tight fit requiring the vent cap to be manually aligned or rotated before tubing connections can be made.

The vent cap 130 includes a body 142 having a gripping portion 146 of conventional design on its upper portion. The body 142 supports a pair of diametrically opposed bayonet tabs 148 and a pair of alignment tabs 150. The alignment tabs 150 are angularly offset from the bayonet tabs 148 as described in conjunction with the previous embodiment.

The vent cap 130 further includes a valve and float structure 160 of conventional design. The gripping portion 146 and the valve/float structure 160 can be of the types illustrated in U.S. Pat. No. 5,832,946 issued Nov. 10, 1998 to Campau and U.S. Pat. No. 6,782,913 issued Aug. 31, 2004 to Campau, the disclosures of which are incorporated by reference.

The cap body 142 defines a water passage 162 opening through the top of the cap body 142. The swivel connector 160 snap-fits within the upper portion of the valve body 142 and is in fluid communication with the water passage 162. The swivel connector 160 is free to swivel or rotate with respect to the valve body.

The vent cap 140 is installed and removed in a fashion similar to that previously described in conjunction with the vent cap 40. Additionally, the swivel connector 160 is available for connection of a watering system to the vent cap 140. Because the swivel connector 160 is free to rotate with respect to the remainder of the vent cap 140, the vent cap may be easily removed for servicing without having to disconnect the watering system tubing.

The above descriptions are those of two current embodiments of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property of privilege is claimed are defined as follows:

1. A vented battery comprising:
   a battery case defining a vent port including internal tabs having a first lead angle; and
   a vent cap including external tabs having a second lead angle substantially similar to the first lead angle, each of the external vent cap tabs including an upper portion and a lower portion, the vent cap having an installed position in which the upper portions of the external vent cap tabs interfit with the internal vent port tabs to retain the vent cap in the vent port, each of the external vent cap tab lower portions including a longitudinally oriented ramp portion adapted to facilitate movement of the external vent cap tabs past the internal vent port tabs as the vent cap is inserted into the vent port axially without rotation, the external vent cap tabs permitting the vent cap to be unscrewed and removed from the vent port, the vent cap further including alignment tabs angularly offset from the external vent cap tabs, the alignment tabs positioned to pass between the internal vent port tabs during installation when the external vent cap tabs are longitudinally aligned with the internal vent port tabs.

2. A vented battery as defined in claim 1 wherein at least one of the internal vent port tabs and external vent cap tabs are resiliently flexible.

3. A vented battery as defined in claim 1 wherein the internal vent port tabs and the external vent cap tabs are bayonet tabs.

4. A vented battery as defined in claim 1 wherein the vent cap further includes a water supply swivel connection.

5. A battery vent cap for installation in a battery vent port including a bayonet tab, the vent cap comprising:
   a vent cap body;
   a vent cap bayonet tab extending from the vent cap body and adapted to interfit with a vent port bayonet tab, the vent cap bayonet tab having a lower portion including a longitudinally oriented ramp portion adapted to facilitate movement of the vent cap bayonet tab past the vent port bayonet tab as the vent cap is inserted into the vent port axially without rotation; and
   an alignment tab extending from the vent cap body and angularly offset from the vent cap bayonet tab, the alignment tab adapted to facilitate longitudinal alignment of the vent cap bayonet tab with the vent port bayonet tab.

6. A battery vent cap as defined in claim 5:
   wherein the vent cap body defines a water passage; and
   further comprising a swivel connector in fluid communication with the water passage.

7. A vented battery comprising:
   a battery case defining a vent port;
   a vent cap removably received within the vent port, the vent port and the vent cap including a locking structure adapted (a) to permit the vent cap to be inserted into the vent port axially without rotational movement, (b) to retain the vent cap axially after insertion, and (c) to permit the vent cap to be removed from the vent port using rotational movement, the locking structure including vent cap thread portions on the vent cap and vent port thread portions within the vent port, the vent cap thread portions each including a lower portion defining a longitudinally oriented ramp to facilitate movement of each vent cap thread portion past a corresponding vent port thread portion as the vent cap is inserted into the vent port without rotational movement, the vent cap further including an alignment tab angularly offset from the vent cap thread portions and longitudinally unaligned with the vent port thread portions when the vent cap thread portions are longitudinally aligned with the vent port thread portions.

8. A vented battery as defined in claim 7 wherein at least one of the vent cap thread portions and the vent port thread portions are resiliently flexible to facilitate movement of the vent cap thread portions past the vent cap thread portions as the vent cap is inserted into the vent port.

9. A vented battery as defined in claim 7 wherein the thread portions comprise bayonet tabs.

10. A vented battery as defined in claim 7 wherein the vent cap thread portions and the vent port thread portions have substantially similar lead angles.

11. A vented battery as defined in claim 7 wherein:
   the vent cap defines a water passage; and
   the vent cap further includes a swivel connection in fluid communication with the water passage and adapted to connect to a battery watering system.

* * * * *